(12) United States Patent
Shrum, Jr. et al.

(10) Patent No.: US 9,563,717 B2
(45) Date of Patent: Feb. 7, 2017

(54) INTELLIGENT CACHING OF CONTENT ITEMS

(75) Inventors: Edgar V. Shrum, Jr., Smyrna, GA (US); John Civiletto, Suwanee, GA (US)

(73) Assignee: Cox Communications, Inc., Atlanta, GA (US)

( * ) Notice: Subject to any disclaimer, the term of this patent is extended or adjusted under 35 U.S.C. 154(b) by 67 days.

(21) Appl. No.: 13/553,536

(22) Filed: Jul. 19, 2012

(65) Prior Publication Data

US 2014/0025769 A1  Jan. 23, 2014

(51) Int. Cl.
*G06F 15/167* (2006.01)
*G06F 17/30* (2006.01)

(52) U.S. Cl.
CPC ................. *G06F 17/30902* (2013.01)

(58) Field of Classification Search
CPC .. H04L 67/2847; H04L 47/70; H04L 67/2842; H04L 67/06; G06F 17/30902
See application file for complete search history.

(56) References Cited

U.S. PATENT DOCUMENTS

| 6,647,411 | B2* | 11/2003 | Towell et al. ............... 709/213 |
| 7,584,491 | B2* | 9/2009 | Bruckner et al. ............ 725/36 |
| 2006/0282542 | A1* | 12/2006 | Pinckney et al. ........... 709/231 |
| 2009/0083279 | A1* | 3/2009 | Hasek ....................... 707/10 |
| 2011/0131341 | A1* | 6/2011 | Yoo .................. G06F 17/30902 709/237 |
| 2013/0007235 | A1* | 1/2013 | Humphreys et al. ........ 709/223 |
| 2013/0018978 | A1* | 1/2013 | Crowe et al. ............... 709/214 |

* cited by examiner

*Primary Examiner* — Cheikh Ndiaye
(74) *Attorney, Agent, or Firm* — Sutherland Asbill & Brennan LLP

(57) ABSTRACT

Systems, methods, and computer-readable media for intelligent caching of content items are provided. A content item may be received by a caching device from a content provider based at least in part on a first request from a user. The caching device may determine a content viewing profile. The caching device may direct storage of the received content item for later retrieval. Additionally, the caching device may provide the stored content item to the user in response to a second request for the content.

17 Claims, 4 Drawing Sheets

INTELLIGENT CACHING OF CONTENT ITEMS

FIELD OF THE DISCLOSURE

Aspects of the invention relate generally to caching content, such as broadband content, and more particularly, to intelligent, network-based caching of content based on heuristics, user profiles, and/or user viewing histories.

BACKGROUND

A wide variety of service or content providers, such as cable providers and satellite providers, provide broadband communications services, such as television, movies, video games, music services, and/or other digital content to customers. Many customers utilize set-top boxes to present such content on one or more televisions or display devices within a single location, such as a home. Set-top boxes are typically dedicated devices that are situated within a customer's home, and allow users to schedule programming content for display, recording, and/or storing. However, content providers may have to transmit identical content multiple times to a single location if multiple users within the location request the same content. For example, if the first and second customers request to view the same show at first and second set-top boxes, respectively, the content provider may have to send the identical content to the same home twice. Moreover, interactive programming guides ("IPGs") are often requested from the content provider every few seconds by multiple set-top boxes within the same home. Again, here the content provider may need to transmit multiple IPGs every few seconds to the same location. Accordingly, finding improved ways to provide digital content to customers continues to be a priority.

BRIEF DESCRIPTION

Some or all of the above needs and/or problems may be addressed by certain embodiments of the invention. Embodiments of the invention may include systems, methods, and computer-readable media for caching content. In one embodiment, a method for caching content may be provided. A content item may be received by a caching device based at least in part on a request from a user. The caching device may determine a content viewing profile and direct storage of the received content item. Additionally, the caching device may provide the stored content to the user in response to a second request for the content item.

In accordance with another embodiment of the invention, a caching system may be provided. The caching system may include at least one communication interface, at least one processor, and at least one memory. The at least one communication interface may be configured to (i) receive, from a user, a request for a content item from a content provider, (ii) transmit the request to the content provider, (iii) receive, from the content provider, the content item, and (iv) provide the content item to the user. The at least one processor may be configured to (i) determine a content viewing profile of the user based at least in part on a viewing history of the user, and (ii) direct storage of the requested content item based at least in part on the viewing profile or a caching instruction associated with the content item. The at least one memory may be configured to store the content viewing profile and the requested content item.

In accordance with yet another embodiment of the invention, a computer-readable media comprising instructions for caching content may be provided. A request for a content item may be received from a user. The content item may be provided to a caching device of the user. Based at least in part on the request, a caching profile for the user may be determined. Additionally, based at least in part on the caching profile, other content items to be stored by the caching device may be determined. Further, the other content items may be provided to the caching device at least in response to determining the other content.

Additional systems, methods, computer-readable media, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Overview

Figure 1:
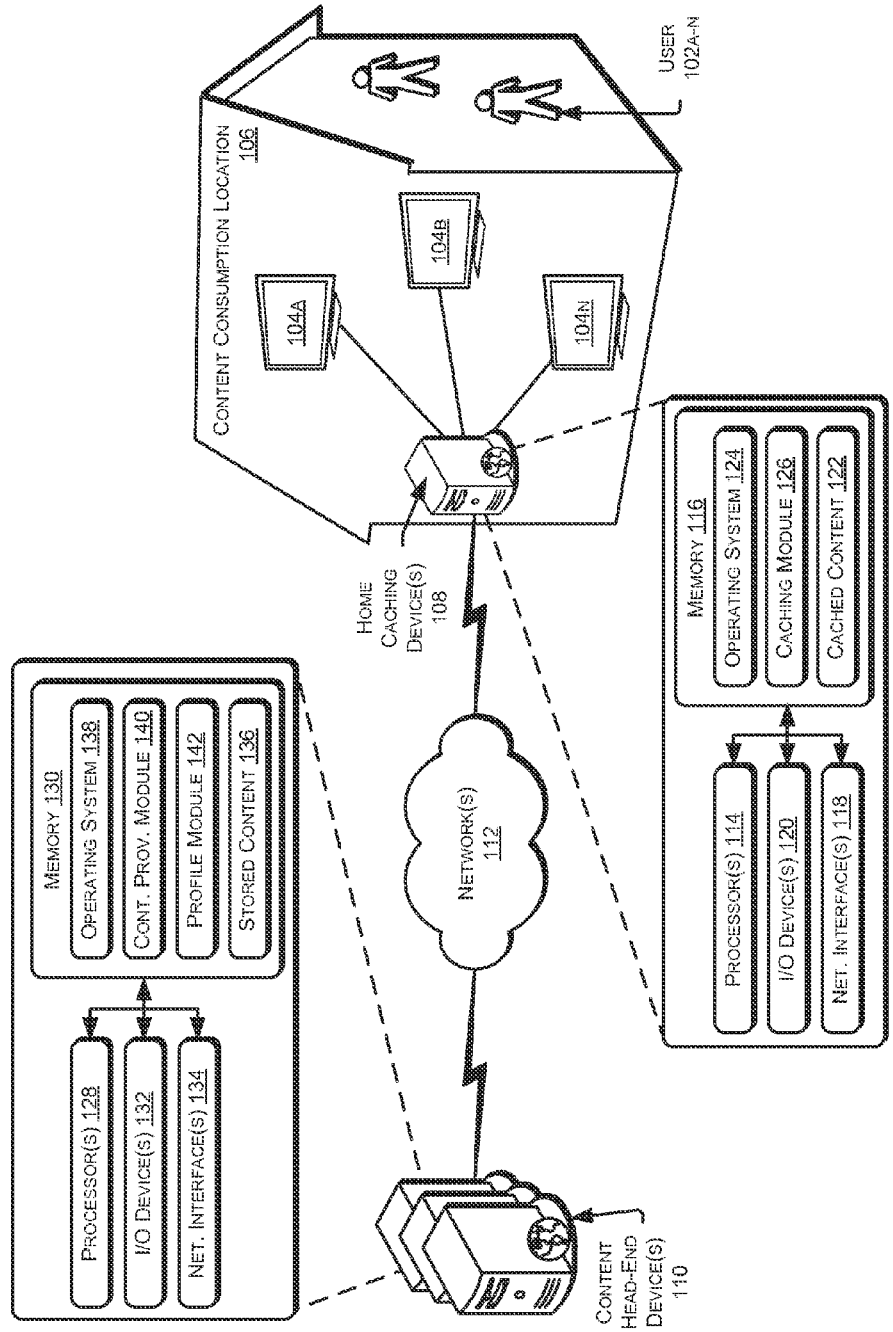
FIG. 1 illustrates a block diagram of one example system that may be utilized to facilitate intelligent caching, according to an illustrative embodiment of the invention.

As noted above, embodiments of the present disclosure are directed to, among other things, systems, methods, and computer-readable media for caching content. As an overview, users (i.e., customers) of a digital content service may access the content via one or more set-top boxes or DVRs connected to televisions ("TVs"). Generally, set-top boxes and/or DVRs may request, record, store, cache, and/or provide live, streaming, or pre-recorded content for display at the request of users of the service. Thus, users may utilize the set-top boxes and/or DVRs to request, record, store, and/or manage digital content for display on a TV or other display device at a specific location. In some examples, digital content may include movies, television shows, video games, other video content, meta-data, application code, music, other audio content, other digital content, combinations of the foregoing, and the like.

In some instances, a caching device may also be used to request content from the content provider and/or transmit content to one or more set-top boxes within a particular location. That is, a caching device may act as a gateway between one or more locations (or groups of locations) and a network-accessible content provider (or content provider computer). For example, a home or household may include one or more caching devices that are in communication, via a network such as the Internet, with a head-end server or other computing device of the content provider. The home caching device may then cache content received from the content provider to be later provided to, and/or displayed by, one or more TVs within the home. Similarly, in some aspects, a caching device may request, receive, cache, and/or provide content to a group of homes, such as but not limited to a neighborhood, an apartment or condo building, a demographic grouping, an area, combinations of the foregoing or the like.

In some instances, a user may request a program to be displayed on a TV, smart TV, or other display device via a set-top box, DVR, multimedia computing device, or the like. The request may then be transmitted to a caching device, such as a location caching device, premise caching device, or home caching device, for processing. Processing the request may include creating or modifying a content viewing profile or caching profile for the user or the location of the user. As used herein, a location may include a home, a household, a unit (such as an apartment or condo), or a grouping of any of the foregoing. Additionally, as used herein, the phrases "content viewing profile" and "caching profile" are synonymous. The home caching device may further process the request by transmitting it to the content provider. Once the content is received by the caching device from the content provider, the caching device may transmit the content to the set-top box or DVR and/or determine, based at least in part on the content viewing profile or an instruction associated with (or contained within) the content item, whether to cache the content for later retrieval or subsequent retrieval by other users within the location. As such, if a second user within the home requests the same content, at the same or a later time, the caching device may be able to provide the content to the set-top box of the second user without making a second request to the content provider. In this way, the content provider may avoid sending multiple copies of the same content.

Additionally, in some aspects, a content viewing profile or a caching profile may be utilized to proactively cache content and/or content channels without receiving requests from any users. As such, and based in part on the content viewing profile and/or the caching profile, the caching device may determine additional content, additional content channels, and/or additional broadcast channels to cache for subsequent retrieval. In this way, the content provider may provide content, copies of content, and/or content channels to the caching device prior to receiving a request for the content. In some examples, this may improve channel change performance.

Similarly, or alternatively, a caching device may act as a gateway between multiple locations and the content provider computers or between multiple home caching devices and the content provider computers. For example, a caching device may be located at a cable tap-out, where a single broadband signal is split among many customers. As such, content may be cached at this location to minimize the number of times the content will be sent to the tap-out location. In some aspects, a caching device may service a single location, a group of locations, and/or multiple groups of locations. Additionally, a caching device may service multiple caching devices, or a chain of caching devices, in that content may be cached at a first caching device and also at the one or more other content caching devices in the chain. In some aspects, servicing includes, but is not limited to, receiving requests for content and providing content either from the content provider or from the caching device's local memory. Additionally, as used herein, caching includes, but is not limited to, storing content in local memory for a predetermined time period. Generally, caching may also refer to temporary storage of content that may be deleted based on a timing schedule, caching schedule, or other criteria, as opposed to content that may be deleted upon user request.

In some instances, a caching device may determine a content viewing profile of a user, of multiple users within a home, of a home, of multiple homes, of groups of homes, any combination of the foregoing, or the like. Additionally, some caching devices may determine content viewing profiles based on viewing histories of associated users, based on content viewing profiles of other caching devices, and/or based on heuristic information gathered at the caching devices and/or by the content providers. Additionally, in some aspects, the content provider may determine a caching profile. In this way, the content provider may provide, push, or otherwise transmit content based on the content viewing profiles determined at the caching devices or based on the content viewing profiles determined by the content provider computers. Further, in some aspects, the caching devices may request content from the content provider or other caching devices for local caching at the caching devices based on the content viewing profiles determined at the caching devices or based on the content viewing profiles determined by the content provider computers.

In addition, caching devices may be controlled by portable devices that may or may not be directly coupled to viewing devices and may or may not be located within a content consumption location (such as set-top boxes and the like). Examples of such portable devices that may communicate with caching devices may include, by way of example only, cell phones, laptops, personal digital assistants ("PDAs"), tablet personal computers ("PCs"), or desktop PCs that are not located at the user's home or business but are accessible via one or more networks, such as the Internet.

Illustrative Architecture

Embodiments of the invention now will be described more fully hereinafter with reference to the accompanying drawings, in which embodiments of the invention are shown. The foregoing ideas may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and computer-readable media including instructions for facilitating the caching of content, such as content items desired and/or selected by a user or users. For example, embodiments of the invention may utilize network-based resources associated with a broadband content provider or a content provider in order to request, cache, and/or provide for display content items on behalf of users of the broadband content provider or the content provider. Additionally, as briefly mentioned above, the caching device may facilitate the caching of content items on behalf of different users. For example, a plurality of users or consumers may request the same content item via a set-top box, smart TV, or the like. Alternatively, or in addition, the set-top box, smart TV, DVR, or the like may act as the caching device. Either way, the caching device and/or the content provider may determine and/or update a content viewing profile of each individual user, the plurality of users as a whole, and/or a group of users. Additionally, the caching device may also transmit the requests to the content provider.

Following receipt of the content items, the caching device may determine, based on the content viewing profile, an amount of space remaining within the memory of the caching device, and/or a viewing history, whether to cache (i.e., temporarily store) the received content. In this way, the caching device may allow the content provider to save on transmissions of the content by storing a cached copy for the second user of the plurality of users rather than requesting the content item a second time. That is, if the caching device has cached a copy of the content item in response to the first request, or in response to the first receipt of the content item, the second request may be satisfied by providing the cached copy of the content item from the caching device.

A wide variety of different types of user or consumer devices may be utilized as caching devices, as desired, in various embodiments of the invention. Examples of suitable user or consumer devices that may be used as caching devices may include, but are not limited to, user premise devices (e.g., set-top boxes, smart TVs, routers, etc.) and/or other user devices (e.g., personal computers, mobile devices, etc.).

FIG. 1 depicts an illustrative architecture 100 in which techniques for intelligent caching of content items may be implemented. In architecture 100, one or more users 102a-n may utilize one or more content display devices and/or set-top boxes 104a-n to request content items for display within a content consumption location 106, such as a home. As described above, one or more caching devices, such as a home caching device 108, may determine a content viewing profile for the home 106 or for each user 102a-n based at least in part on the request, the content item, a viewing history, the time or frequency of the request (or similar requests), and/or other heuristic information gathered regarding the users 102a-n and/or the home 106 as a whole (i.e., any combination of users 102a-n). Additionally, the home caching device 108 may request the content item from one or more content head-end devices 110 via one or more networks 112. In some aspects, the content head-end devices 110 may be owned, operated, and/or otherwise controlled by a content or service provider, such as but not limited to a broadband cable provider or the like.

Additionally, in some aspects, a user 102 may interact with the home caching device 108 for requesting content items from the content head-end devices 110 via the networks 112. The user 102 may be physically located within the content consumption location 106, such as a home or business, and access the home caching device 108 directly. In this example, the home caching device 105 may reside within the content consumption location 106, may be directly, or indirectly, coupled to a viewing device 104, such as a set-top box, TV, or other output device, and may be accessible via the one or more networks 112. In this way, the home caching device 108 may be able to communicate with the content head-end device 110. Additionally, or alternatively, the user 102 may interact with a separate user device that is also accessible via the networks 112. The user device may be configured to request content items from the content head-end device 110 directly via the networks 112, or it may be configured to facilitate requests for content items by transmitting the request via the home caching device 108.

With further reference to FIG. 1, any number of home caching devices 108 may be provided. Each home caching device 108 may be associated with a customer of a content provider (e.g., a cable content provider, a satellite content provider, etc.) that controls and/or operates the one or more set-top boxes or display devices 104a-n. As desired, a single customer may be associated with multiple home caching devices 108 and/or multiple set-top boxes/display devices 104a-n. For example, multiple set-top boxes 104a-n may be situated within a content consumption location 106 (e.g., the customer's home).

Each home caching device 108 may be a suitable device or component for facilitating the receipt, processing, and/or output of at least one broadband signal, such as a broadband cable signal, a broadband satellite signal, or other network-accessible content. Additionally, the home caching device 108 may facilitate the receipt and processing of user requests for content items, such as user requests to record and/or store content items that will be broadcast at a subsequent point in time (e.g., upcoming television content, etc.), content items that are to be or have been uploaded (e.g., music or movie content uploaded by a user), or content items that are to be played (e.g., a video game, etc.). In certain embodiments, the home caching device 108 may be a customer premise device or component that is situated within a customer's household or other structure associated with the customer. Additionally, the home caching device 108 may be located within a distribution network or with the content provider. The home caching device 108 may include suitable hardware and/or software components capable of receiving and processing a broadband signal (e.g., a cable signal, a satellite signal, etc.) output by a content head-end device 110, such as a cable content storage device or a satellite content storage device. Examples of suitable content processing devices include, but are not limited to, a personal computer, a set-top box ("STB") (e.g., a cable STB, a digital satellite STB, an Internet Protocol ("IP") Television STB, etc.), a virtual STB, an embedded STB, or the like.

In certain embodiments, the home caching device 108 may be connected, directly or indirectly, to one or more viewing devices 104a-n, or other output devices, such as but not limited to a TV, a computer monitor, or speakers associated with a customer. In other embodiments, the home caching device 108 may be embedded, incorporated into, and/or executed on the viewing devices 104a-n. In operation, the home caching device 108 may receive at least a portion of a broadband data signal, or other content, output by the content head-end device 110, and the home caching device 108 may convert at least a portion of the received signal into content which is displayed or otherwise output by the viewing devices 104a-n.

Additionally, as desired, the home caching device 108 may be configured to direct caching of at least a portion of the broadband content that will be received by the home caching device 108. Following transmission of the request for a content item, the home caching device 108 may be configured to download or otherwise receive the requested content. As desired, the home caching device 108 may receive a broadband data signal and/or recorded content via any number of suitable networks 112, such as a cable network that includes any number of optical fibers, coaxial cables, and/or cable drops, a satellite network that includes a suitable satellite dish and/or connecting cables, and/or other suitable networks such as, but not limited to, the Internet. Additionally, any number of intermediary devices, such as broadband modems, routers, etc., may be situated between the content head-end devices 110 and the home caching device 108.

As desired, the broadband signal provided to the home caching device 108 may include a wide variety of data components, including but not limited to, a television signal, a digital television signal, data associated with a Voice over IP ("VoIP") telephone service, data associated with Internet service, data associated with home monitoring services, etc. The home caching device 108 may receive and process the broadband signal. As desired, the home caching device 108 may selectively output a portion of the broadband signal such as, but not limited to, digital television data (e.g., audio and/or video data), IPG data, various Web pages, audio files, video games, meta-data, application code, etc., to the viewing devices 104*a-n* for consumption. Additionally, in certain embodiments, the home caching device 108 may selectively cache or otherwise store received content items in one or more suitable memory devices for subsequent output or presentation to a customer or user 102 via the viewing devices 104*a-n*. For example, cached content items downloaded from the content head-end devices 110 may be stored as desired by the home caching device 108. In some aspects, the received content items may include instructions configured to direct the caching device to cache the content items or, in some examples, to indicate the content items are not eligible to be cached. Any number of suitable connections and/or connecting devices, such as coaxial cables, High-Definition Multimedia Interface ("HDMI") cables, wireless connections, etc., may be utilized to connect the home caching device 108 to a suitable viewing device 104. Additionally, in certain embodiments, the home caching device 108 may output audio data to any number of audio components, such as a home theater system, stereo system, remote speakers, portable music player, smart phone, tablet PC, etc.

Additionally, the home caching device 108 may be configured to determine a caching or content viewing profile based at least in part on heuristic information associated with the user 102. In some aspects, the heuristic information may include information collected by the home caching device 108 and/or the content head-end device 110 and may be associated with the content item received, the request, a time and/or frequency of the request, and/or demographic information associated with the users 102*a-n* and/or neighboring users. Further, caching selectivity (e.g., what content items to cache and/or for how long) may be based at least in part on the determined content viewing profile. Further, a caching profile for a first user 102*a* within a content consumption location or home 106 may be determined based at least in part on heuristic information associated with a second user 102*b* within the same home 106 or another home.

The home caching device 108 may be a suitable processor-driven device that facilitates the receipt, processing, caching, and/or output of a broadband signal or content items. Additionally, the home caching device 108 may be a suitable processor-driven device that facilitates the receipt and processing of user commands to view, record, and/or store content items. As such, the home caching device 108 may include any number of computing devices, such as a personal computer, a digital assistant, a PDA, a smart phone, a digital tablet, an Internet appliance, an application-specific circuit, a microcontroller, a minicomputer, or any other processor-based device. The execution of suitable computer-implemented instructions or computer-executable instructions by the home caching device 108 may form a special purpose computer or other particular machine that is operable to facilitate the processing of commands and/or the processing and output of broadband content (including downloaded cached content).

With further reference to FIG. 1, each home caching device 108 may include one or more processors 114, one or more memory devices 116, one or more transceivers and/or network interfaces 118, and/or one or more input/output ("I/O") devices 120. The processors 114 may be configured to execute any number of software applications and/or computer-readable or computer-executable instructions. The memory devices 116 may include any number of suitable memory devices, such as caches, read-only memory devices, random access memory devices, flash memory devices, magnetic storage devices, removable storage devices (e.g., memory cards, etc.), etc. The memory devices 116 may include internal memory devices and/or external memory devices in communication with the home caching device 108. The memory devices 116 may store data, executable instructions, and/or various program modules utilized by the processors 114. Examples of data that may be stored by the memory devices 116 include cached content 122 (e.g., downloaded cached content and/or locally stored cached content, etc.), content viewing profiles, and/or any number of suitable program modules that may be executed by the processors 114, such as an operating system ("OS") 124, and/or a caching module 126.

The cached content 122 may include content items that have been downloaded and/or cached by the home caching device and, in certain embodiments, content items that have been recorded locally by the home caching device 108. For example, the cached content 122 may include content items that have been recorded by the content head-end device 110 and communicated from the content head-end device 110 to the home caching device 108. As another example, the cached content 122 may include video and/or audio content recorded by the home caching device 108 or a local recording device (e.g., a digital video recording device, a second home caching device 108, etc.) in communication with the home caching device 108.

In some examples, the cached content 122 may be stored in one or more internal memory devices (e.g., internal hard drives, internal flash drives, etc.) of the home caching device 108 and/or in one or more external memory devices accessible by the home caching device 108. In certain embodiments, a home caching device 108 may not include a memory for storing cached content items. For example, caching may be completed by a content storage device, and cached content items may be streamed to the home caching device 108 or provided to the home caching device 108 in a video on-demand session.

The OS 124 may be a suitable software module that controls the general operation of the home caching device 108. The OS 124 may also facilitate the execution of other software modules, for example, the caching module 126 or an IPG application. The IPG application may be a suitable software module that facilitates the processing of program guide information received by the home caching device 108. For example, electronic program guide ("EPG") information may be included in a broadband signal received by the home caching device 108. The IPG application may format at least a portion of the received EPG data for presentation to a customer via an IPG grid. For example, received EPG data may be parsed and organized by channel and time slot. The organized data may then be formatted for display in an IPG grid. For example, based upon the receipt of a user command or request for IPG data, such as a selection of a remote control button or option associated with requesting guide data, the IPG application may direct the output of the IPG grid for presentation to the customer via the viewing device 104.

Once presented, a user may navigate through a displayed IPG grid in order to view scheduled content, such as current and upcoming television content. For example, the user may utilize a remote control to navigate through the IPG grid. As desired, the user may utilize the IPG grid to request the recording of content items. For example, the user may select an individual entry included in the grid, and the user may request that the content associated with the grid entry be recorded. A content request made by the user may be received by the IPG application and provided to the caching module 126.

The caching module 126 may be a suitable software module that facilitates the caching of content items on behalf of a user and based at least in part on a determined caching profile or content viewing profile. In operation, the caching module 126 may receive a user command or request for a content item. In certain embodiments, a user command for a content item may be received via a user's interaction with an IPG grid. In other embodiments, a user command for a content item may be received via one or more suitable network communications. For example, a user may utilize a suitable user device (e.g., a personal computer, a mobile device, etc.) to access a Web-based application hosted by the content head-end device 110, and the user may request, via the Web-based application, that content be recorded. The content head-end device 110 may then communicate the content request to the home caching device 108 via one or more suitable networks 112, such as a content provider network. As yet another example, a user may utilize a user device to directly access an application hosted by the home caching device 108 (e.g., the caching module 126), and a user command for content may be communicated to the home caching device 108. For example, a wireless communications session (e.g., a Bluetooth communications session, a Wi-Fi communications session, etc.) may be established between a user device and the home caching device 108, and a request may be received via the established communications session.

Once a user command for a content item has been received, the caching module 126 may generate a request for the content item, and the request for the content item may be communicated to the content head-end device 110. A wide variety of information may be included in the request, such as an identifier of the home caching device 108, an identifier of the content item, an identifier of the user, customer account information associated with the user, and/or a scheduled or preferred content viewing time. Following the communication of the request to the content head-end device 110, the caching module 126 may receive one or more responses to the request. For example, the caching module 126 may receive an indication that the request has been completed. Additionally, based at least in part on the requested content item and/or heuristic information associated with the requested content item and/or the user 102, the caching module 126 may determine a caching or content viewing profile. As noted, a caching or content viewing profile may identify content items that are expected or otherwise predicted to be requested by one or more users 102a-n of the home 106.

A wide variety of suitable methods and/or techniques may be utilized as desired by the caching module 126 to download and cache content items from the content head-end device 110. As one example, a passive downloading process may be utilized by the caching module 126 to request a download of the content item. In this regard, the content item may be downloaded to the home caching device 108 in a background process that is transparent to the user 102. As desired, a wide variety of download parameters may be evaluated by the caching module 126 in order to determine when to download the content item. Examples of suitable download parameters that may be evaluated include, but are not limited to, a time of day, an available bandwidth for downloading content, a type of download to be performed (e.g., video on-demand session, narrowcast, unicast, etc.), an availability of local resources associated with the home caching device 108, and/or a determination of when the recorded content will likely be viewed by the user. As desired in various embodiments, a wide variety of different types of download sessions may be utilized to download content to one or more home caching devices 108. Examples of suitable types of download sessions include background sessions (e.g., trickle download sessions, etc.), real-time download sessions, and/or faster than real-time download sessions. Additionally, as desired, historical behavior may be evaluated in conjunction with the download parameters. As a result of evaluating the download parameters, the caching module 126 may determine an appropriate time to download the content item. For example, the content item may be downloaded at a time when sufficient network bandwidth is available, such as late at night or while a user is likely at work or school. As another example, if it is determined that a user will likely request viewing of the content item before a certain time, attempts may be made to download the content item prior to reaching the time at which the content will likely be requested.

As another example of downloading a content item, the caching module 126 may request a download based upon the receipt of a user command or request to download, view, listen, and/or interact with the content item. For example, in certain embodiments, an indication or message indicating that the content is available at the content head-end device 110 may be output for presentation to the user. In response to the output indication or message, the user may request that the content item be downloaded. In other embodiments, a user request to view the content item may be received. Once the request to view the content item has been received, the caching module 126 may initiate a download of the content. In yet other embodiments, the caching module 126 may initiate a dynamic download session of the content item that permits download of the content and approximately simultaneous presentation of the downloaded content in real-time or near real-time. A dynamic download session may be similar to a video on-demand session. During a dynamic download session, the content may be streamed to the home caching device 108 by the content head-end device 110, and the content item may be output for presentation to the user. In certain embodiments, the initiation of a dynamic download session may be a background operation that is transparent to the user. Additionally, as desired, the downloaded content item may be cached by the home caching device 108 in one or more suitable memory devices.

With continued reference to the home caching device 108, the one or more I/O interfaces 120 may facilitate communication between the home caching device 108 and one or more input/output devices, for example, one or more user interface devices, such as a remote control, display, keypad, mouse, pointing device, control panel, touch screen display, microphone, speaker, etc., that facilitate user interaction with the home caching device 108. In this regard, user commands may be received by the home caching device 108. The one or more network interfaces 118 may facilitate connection of the home caching device 108 to one or more suitable networks 112, such as content provider networks or broadband networks (e.g., a cable network or a satellite network) and/or local area networks (e.g., a Bluetooth-enabled network, a Wi-Fi enabled network, etc.). In this regard, the home caching device 108 may receive a broadband signal for processing and output. Additionally, the home caching device 108 may communicate commands and/or requests to the content head-end device 110, and the home caching device 108 may receive commands and/or information from the content head-end device 110. Additionally, as desired, the home caching device 108 may communicate with any number of user devices via one or more local area networks.

With continued reference to FIG. 1, each of the one or more viewing devices 104*a-n* may be any suitable device configured to receive content output by the home caching device 108 and to present at least a portion of the content to one or more users 102*a-n*. Examples of suitable viewing devices 104*a-n* include, but are not limited to, TVs, monitors, and/or stereo systems or speaker(s).

With continued reference to FIG. 1, the content head-end device 110 may include any number of systems and/or devices that facilitate the output of a broadband signal for receipt by any number of home caching devices 108. For example, the content head-end device 110 may include systems associated with a cable content provider, a satellite content provider, or other content provider. In operation, the content head-end device 110 may receive content from one or more content providers, format content for output in a broadband signal, and/or output the broadband signal. Examples of suitable systems that may be associated with the broadband source include, but are not limited to, a content provider head-end component, a conditional access system controller, any number of encryption devices, an electronic program guide data server, an on-demand server, a pay-per-view purchase server, a music server, etc.

According to an aspect of the invention, the content provider may include or be associated with a content head-end device 110 that facilitates transmission of content items on behalf of various customers of the content provider. The content head-end device 110 may include a wide variety of resources that facilitate the transmission of any number of content items on behalf of customers.

The content head-end device 110 may be a suitable processor-driven device configured to receive and process requests to store content items. Examples of suitable processor-driven devices that may be utilized as a content head-end device 110 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the content head-end device 110 may form a special purpose computer or other particular machine that is operable to facilitate the receipt of requests to store content items, the processing of received storing requests, the storing of content items, and/or the communication of stored content to one or more home caching devices 108 or other customer devices.

In addition to one or more processors 128, the content head-end device 110 may include one or more memory devices 130, one or more input/output ("I/O") devices 132, and/or one or more network interfaces 134. The processors 128 may be configured to execute any number of software applications and/or computer-readable or computer-executable instructions. The memory devices 130 may include any number of suitable memory devices, such as caches, read-only memory devices, random access memory devices, flash memory devices, magnetic storage devices, etc. The memory devices 130 may store data, executable instructions, and/or various program modules utilized by the processors 128. Examples of data that may be stored by the memory devices 130 may include stored content items 136 and/or stored content viewing profiles. Additionally, the memory devices 130 may be configured to store any number of suitable program modules that may be executed by the processors 128, such as an operating system ("OS") 138, a content providing module 140, and/or a profile module 142.

The stored content items 136 may include content items that have been stored by the content head-end device 110 and/or associated with identification information (e.g., an identifier of one or more requesting home caching devices 108, identifiers of customer accounts, etc.).

The OS 138 may be a suitable software module that controls the general operation of the content head-end device 110. The OS 138 may also facilitate the execution of other software modules by the processors 128, for example, the content providing module 140 and/or the profile module 142. In some aspects, the content providing module 140 may be a suitable software module that facilitates the processing of storage requests, and the distribution of content items to one or more home caching devices 108. In operation, the content providing module 140 may receive one or more requests for a content item from any number of customer devices, such as the home caching devices 108 and/or the user devices. The content providing module 140 may then schedule transmission of the content item on behalf of the various customers that requested the storage. Additionally, information associated with the customers that requested the content item may be stored. For example, identifying information for customer devices, a customer identifier, and/or customer account information (e.g., billing account, content provider account, etc.) may be stored.

The content providing module 140 may additionally be configured to process requests received from home caching device 108 to download a content item. If a received request is a request to download a content item via a dynamic download session, then the content providing module 140 may determine whether network resources are available to establish a dynamic download session. If resources are available, then the content providing module 140 may establish the dynamic download session to download the whole content item. If resources are not available or if the request is not a request for a dynamic download session, then the content providing module 140 may evaluate one or more download parameters in order to determine whether the content may be downloaded to the requesting home caching device 108. In this regard, the content providing module 140 and/or the home caching device 108 may identify and/or schedule a time at which the content item will be downloaded. Additionally, in certain embodiments, the content providing module 140 may monitor a duration of time for which a content item will be stored. For example, the content providing module 140 may delete a cached content item and/or direct the deletion of a cached content item if the content item is not requested for download within a predetermined period of time (e.g., a week, etc.). Additionally, in some aspects, the content providing module 140 may push content items, without a request, to the home caching device 108 based at least in part on a caching profile determined by the content head-end device 110 and/or the home caching device 108.

Additionally, the profile module 142 may be configured to determine a caching or content viewing profile for a user 102 of a home 106, for other users of the home 106, or for users of different homes. The content viewing profile may be determined by the content head-end device 110 based at least in part on requests for content, previously cached content items, other heuristic information associated with the users 102, and/or the content viewing profile already determined and stored.

With continued reference to the content head-end device 110, the one or more I/O interfaces 132 may facilitate communication between the content head-end device 110 and one or more input/viewing devices, for example, one or more user interface devices, such as a display, keypad, mouse, pointing device, control panel, touch screen display, remote control, microphone, speaker, etc., that facilitate user interaction with the content head-end device 110. In this regard, user commands may be received by the content head-end device 110. The one or more network interfaces 134 may facilitate connection of the content head-end device 110 to one or more suitable networks 112, for example, a broadband network or content provider network (e.g., a cable network, a satellite network, etc.) that facilitates communication with home caching devices 108 and/or one or more networks 112 (e.g., the Internet, etc.) that facilitate communications with any number of user devices.

Communications between various components of the architecture 100 may be facilitated via any number of suitable networks 112, such as one or more content provider networks (e.g., a cable network, a satellite network, etc.) and/or other networks. The networks 112 may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless.

Those of ordinary skill in the art will appreciate that the architecture 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Figure 2:
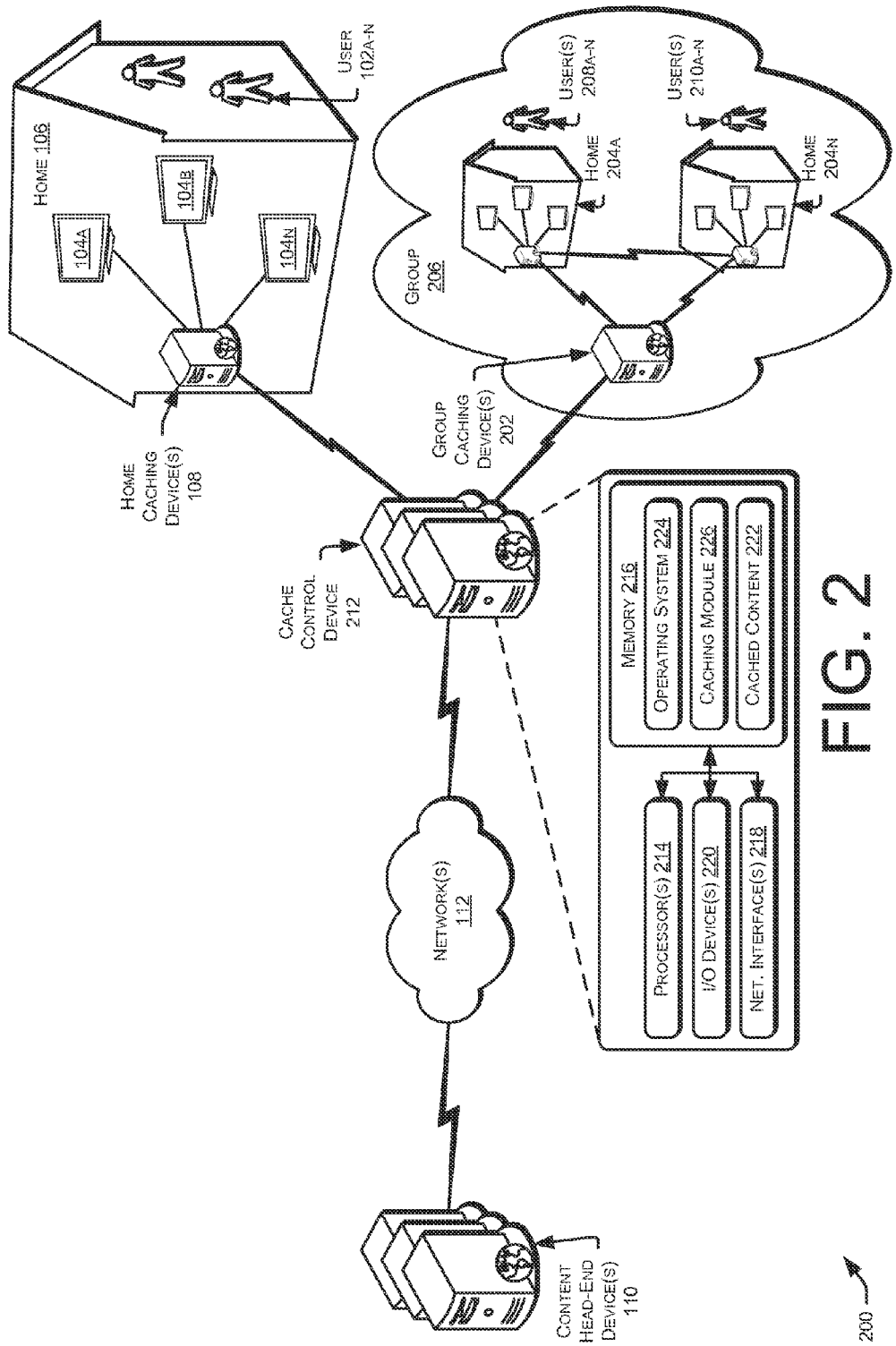
FIG. 2 illustrates a block diagram of another example system that may be utilized to facilitate additional intelligent caching, according to an illustrative embodiment of the invention.

FIG. 2 depicts an illustrative architecture 200 in which additional techniques for intelligent caching of content items may be implemented. Similar to architecture 100, in architecture 200, one or more users 102a-n may utilize one or more content display devices and/or set-top boxes 104a-n to request content items for display within a content consumption location 106, such as a home. As described above, one or more caching devices, such as a home caching device 108, may determine a content viewing profile for the home 106 or for each user 102a-n based at least in part on the request, the content item, a viewing history, the time or frequency of the request (or similar requests), and/or other heuristic information gathered regarding the users 102a-n and/or the home 106 as a whole (i.e., any combination of users 102a-n). Additionally, the home caching device 108 may request the content item from one or more content head-end devices 110 via one or more networks 112.

Additionally, in some aspects, one or more other caching devices, such as a group caching device 202, may determine a content viewing profile for one or more homes 204a-n within a group 206. As shown in FIG. 2, the group caching device(s) 202 may service, determine content viewing profiles, cache content for, and/or provide content to two separate homes, for example homes 204a and 204n; however, in other examples, any number of homes may be within the group 206. As such, group caching device 202 may serve as a gateway between the home caching devices of homes 204a and 204n, respectively, and the content head-end devices 110. Further, while the individual home caching devices of homes 204a-n may determine caching profiles of the respective users 208a-n and/or 210a-n, the group caching devices 202 may determine caching profiles for each of users 208a-n, users 210a-n, homes 204a-n individually, homes 204a-n as a group 206, or any combination of the foregoing, or the like.

In some instances, the group caching devices 202 may determine caching profiles in a similar fashion as the home caching devices 108 of FIG. 1. That is, the group caching devices 202 may determine caching profiles based at least in part on a request for a content item, the requested content item itself, a viewing history of users or devices, a time or frequency of the request (or similar requests), and/or other heuristic information gathered regarding the users 208a-n, 210a-n, the homes 204a-n as a whole (i.e., any combination of users within each home), and/or the group 206. Additionally, the group caching devices 202 may then request a content item from the one or more content head-end devices 110 via the one or more networks 112 based at least in part on the caching profiles. Caching profiles may be stored in the group caching devices 202, the home caching devices 108, and/or the content head-end devices 110. However, as noted above, in some aspects, the content head-end devices 110 may push content to be cached by the group caching devices 202 and/or the home caching devices 108.

Further, in some examples, individual home caching devices may communicate with one another or with the group caching devices 202 to share caching profiles. In this way, a caching profile for a user 208a-n of home 204a may be determined, updated, or otherwise modified based at least in part on a caching profile for a user 210a-n of home 204n. By way of example only, a home caching device of home 204a may communicate a caching profile to a home caching device of home 204n via a wireless communications session (e.g., a Bluetooth communications session, a Wi-Fi communications session, a near field communications ("NFC") session, etc.). Similarly, or in the alternative, the home caching devices may share the caching profiles via the group caching devices 202 by first sharing the caching profiles with the group caching devices 202. Additionally, in some aspects, caching profiles may be shared, determined, updated, or otherwise modified based on social network site information, such Facebook™ or the like, or based on social graphs that may be generated based on demographic information, geographic information, and/or information obtained via a user's contacts stored at one or more devices within the home.

Additionally, in some aspects, a cache control device 212 may be implemented as a gateway between the home caching devices 108, the group caching devices 202, and or the content head-end devices 110. That is, a cache control device 212 may be configured to act as a home caching device 108, but for a plurality of other home caching devices 108 and/or group caching devices 202. In other words, the cache control device 212 may receive requests for content from any number of home caching devices 108 and/or group caching devices 202, determine caching profiles for any subset of such devices and/or the users within the homes and/or groups associated with such devices, and/or cache content on behalf of such groups, devices, and/or users. In this way, several groups, clusters, neighborhoods, or other organizations may be serviced by a single caching device.

With further reference to FIG. 2, each cache control device 212 may include one or more processors 214, one or more memory devices 216, one or more transceivers and/or network interfaces 218, and/or one or more input/output ("I/O") devices 220. The processors 214 may be configured to execute any number of software applications and/or computer-readable or computer-executable instructions. The memory devices 216 may include any number of suitable memory devices, such as caches, read-only memory devices, random access memory devices, flash memory devices, magnetic storage devices, removable storage devices (e.g., memory cards, etc.), etc. The memory devices 216 may include internal memory devices and/or external memory devices in communication with the cache control device 212. The memory devices 216 may store data, executable instructions, and/or various program modules utilized by the processors 214. Examples of data that may be stored by the memory devices 216 include cached content 222 (e.g., downloaded cached content and/or locally stored cached content, etc.), caching profiles, and/or any number of suitable program modules that may be executed by the processors 214, such as an operating system ("OS") 224, and/or a caching module 226.

The cached content 222 may include content items that have been downloaded and/or cached by the cache control device 212. In some examples, the cached content 222 may be stored in one or more internal memory devices (e.g., internal hard drives, internal flash drives, etc.) of the cache control device 212 and/or in one or more external memory devices accessible by the cache control device 212. In certain embodiments, a cache control device 212 may not include a memory for storing cached content items. For example, caching may be completed by a content storage device, and cached content items may be streamed to the cache control device 212 or provided to the cache control device 212 in a video on-demand session.

The OS 224 may be a suitable software module that controls the general operation of the cache control device 212. The OS 224 may also facilitate the execution of other software modules, for example, the caching module 226. The caching module 226 may be a suitable software module that facilitates the caching of content items on behalf of a user and based at least in part on a determined caching profile or content viewing profile. In operation, the caching module 226 may receive a user command or request for a content item from a group caching device 202, a home caching device 108, and/or a user 102, 208, and/or 210. In certain embodiments, a user command for a content item may be received via one or more suitable network communications. For example, a user may utilize a suitable user device (e.g., a personal computer, a mobile device, etc.) to access a Web-based application hosted by the content head-end device 110, and the user may request, via the Web-based application, that content be recorded.

The content head-end device 110 may then communicate the content request to the cache control device 212 via one or more suitable networks 112, such as a content provider network. As yet another example, a user may utilize a user device to directly access an application hosted by the cache control device 212 (e.g., the caching module 226), and a user command for content may be communicated to the cache control device 212. For example, a wireless communications session (e.g., a Bluetooth communications session, a Wi-Fi communications session, etc.) may be established between a user device and the cache control device 212, and a request may be received via the established communications session. Additionally, as noted above, the requests from the user may also be communicated to the content head-end device 110 via the cache control device 212.

Once a user command for the content item has been received, the caching module 226 may generate a request for the content item, and the request for the content item may be communicated to the content head-end device 110. A wide variety of information may be included in the request, such as an identifier of the cache control device 212, an identifier of the content item, an identifier of the user, customer account information associated with the user, and/or a scheduled or preferred content viewing time. Following the communication of the request to the content head-end device 110, the caching module 226 may receive one or more responses to the request. For example, the caching module 226 may receive an indication that the request has been completed. Additionally, based at least in part on the requested content item and/or heuristic information associated with the requested content item and/or the user 102, the caching module 226 may determine a caching or content viewing profile. As noted, a caching or content viewing profile may identify content items that are expected or otherwise predicted to be requested by one or more users.

A wide variety of suitable methods and/or techniques may be utilized as desired by the caching module 226 to download and cache content items from the content head-end device 110. As one example, a passive downloading process may be utilized by the caching module 226 to request a download of the content item. In this regard, the content item may be downloaded to the cache control device 212 in a background process that is transparent to the user 102. As desired, a wide variety of download parameters may be evaluated by the caching module 226 in order to determine when to download the content item. Examples of suitable download parameters that may be evaluated include, but are not limited to, a time of day, an available bandwidth for downloading content, a type of download to be performed (e.g., video on-demand session, narrowcast, unicast, etc.), an availability of local resources associated with the cache control device 212, and/or a determination of when the recorded content will likely be viewed by the user. As desired in various embodiments, a wide variety of different types of download sessions may be utilized to download content to one or more home caching devices 108. Examples of suitable types of download sessions include background sessions (e.g., trickle download sessions, etc.), real-time download sessions, and/or faster than real-time download sessions. Additionally, as desired, historical behavior may be evaluated in conjunction with the download parameters. As a result of evaluating the download parameters, the caching module 226 may determine an appropriate time to download the content item. For example, the content item may be downloaded at a time when sufficient network bandwidth is available, such as late at night or while a user is likely at work or school. As another example, if it is determined that a user will likely request viewing of the content item before a certain time, attempts may be made to download the content item prior to reaching the time at which the content will likely be requested.

Illustrative Processes

Figure 3:
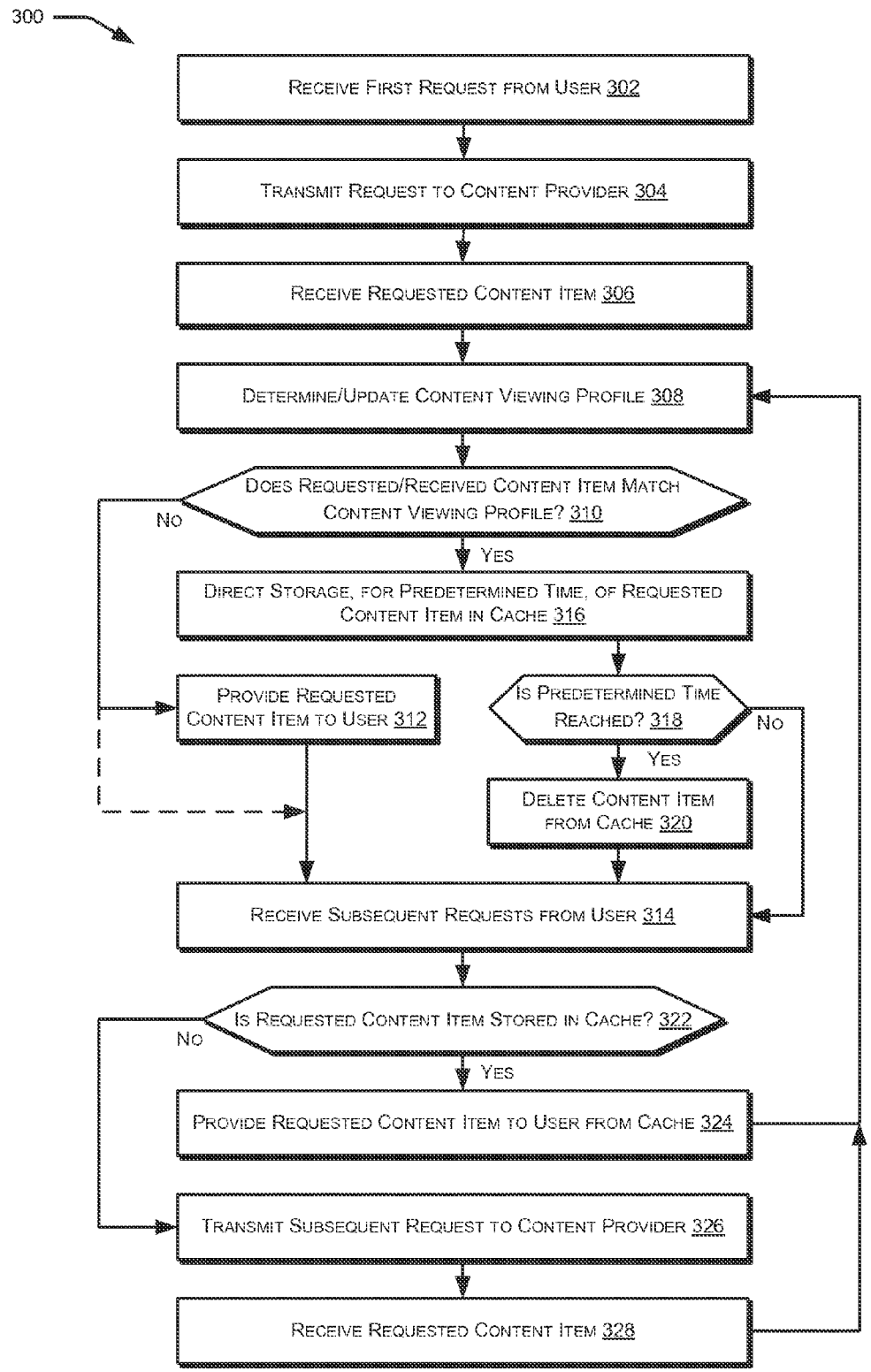
FIG. 3 is a flow diagram of one example method that may be performed by a caching device to cache a content item, according to an example embodiment of the invention.

FIG. 3 illustrates a flow diagram of an example method 300 that may be performed by a caching device to intelligently cache content items, such as the home caching device 108 illustrated in FIG. 1 and/or the group caching device 202 or cache control device 212 illustrated in FIG. 2. However, the method 300 may be performed by any number of suitable devices, such as a set-top box, a smart TV, a DVR, a PC, a laptop, a tablet computer, a PDA, any combination of the foregoing, or the like. In certain embodiments, the method 300 may be performed by a suitable caching module associated with a home caching device 108, such as the caching module 126 illustrated in FIG. 1.

The method 300 may begin at block 302, where the method 300 may receive a first request from a user, such as one of the users 102*a-n*. In some aspects, the request may be received via the one or more network interfaces 118 and/or I/O devices 120 illustrated in FIG. 1. Additionally, the request may be received from a set-top box, a DVR, a smart TV, or other device directly or indirectly coupled to a viewing device, such as one of viewing devices 104a-n of FIG. 1. At block 304, the method 300 may transmit the request to a content or service provider, or a content provider computer such as, but not limited to, the content head-end device 110 of FIG. 1.

In response to the transmitted request, or based on a data push implemented by the content provider, the method 300 may receive the requested content item at block 306. For example, the requested content item may be received by one or more I/O devices 120 and/or via the network interfaces 118 of FIG. 1. Additionally, in some instances, the method 300 may include receiving the content item at block 306 without first requesting the content item from a content provider. In that way, the content provider may attempt to provide appropriate content for the caching device.

At block 308, the method 300 may determine and/or update a content viewing or caching profile. If no caching profile has been previously generated, the method 300 may determine a caching profile at block 308. However, if a caching profile has already been determined, the method may update or otherwise modify the caching profile at block 308. Further, and as noted above, the caching profile may be based, in part, on a user's viewing history and/or an instruction found within the content items. At block 310, the method 300 may determine whether the requested or received content item matches the content viewing profile. For example, if a caching profile indicates that a user watches mostly sitcoms, the determination at block 310 may compare the type of content received to determine if it is a sitcom. In other examples, the caching profile may indicate that a user prefers other criteria. Criteria may include a type of content, a genre content, a time when content is provided or available, or the like. Any combination of criteria may make up a caching profile. If, at block 310, the method 300 determines that the requested/received content item does not match the content viewing profile, the method may then provide the requested content item to the user at block 312. Alternatively, if the content item was not actually requested by the user, the method may skip block 312 and proceed directly to receiving subsequent requests for content items from users at block 314. However, when the method 300 provides the requested content item to the user at block 312, the method 300 may then proceed to block 314.

On the other hand, if the method 300 determines, at block 310, that the requested/received content item does match the content viewing profile, the method 300 may direct storage of the requested content item in the cache memory at block 316. Further, in some examples, the method 300 may direct storage of the received content item based on an instruction associated with (or contained within) the content item itself. In some non-limiting examples, storing the content item in the cache at block 316 may include storing the content item for a predetermined time and/or in the memory 116 of FIG. 1. In some examples, the predetermined time may be determined by the method 300, by a different method of the caching module 126, based on available space within the memory 116, and/or based on the amount of cached content 122 already stored within the memory.

The method 300 may then determine if the predetermined time is reached at block 318. If it is, the method 300 may delete the content item from the cache at block 320. Alternatively, if the predetermined time is not reached at decision block 318, the method 300 may begin to receive subsequent requests from the user at block 314, effectively maintaining the cached content 122 in the memory 116. In some examples, decision block 318 may be implemented by a flag set in memory 116 for each content item. The flag may indicate that the predetermined time has expired for a particular content item. Additionally, in some aspects, the method 300 may periodically check the flag for each content item and delete content items from the cache at block 320 whenever the flag indicates it is appropriate.

At decision block 322, the method 300 may determine if the requested content item is stored in the cache. While block 322 is shown following receipt of a subsequent request from a user at block 314, the determination of whether a requested content item is stored in the cache may be processed after any request from a user, for example, after block 302. If the requested content is stored in the cache at block 322, the method may provide the requested content to the user from the cache at block 324. In some examples, providing the requested content from the cache at block 324 may include utilizing the one or more I/O devices 120 and/or the one or more network interfaces 118 of FIG. 1. The method 300 may then return to block 308 to determine and/or update the content viewing profile based at least in part on the newly requested content item.

Alternatively, if the method 300 determines, at block 322, that the requested content item is not stored in the cache, the method 300 may transmit a subsequent request to the content provider at block 326. Upon receipt of the requested content item at block 328, the method 300 may then return to block 308 to continue determining and/or updating the content viewing profile of the user, home, group of homes, or other category of users.

Figure 4:
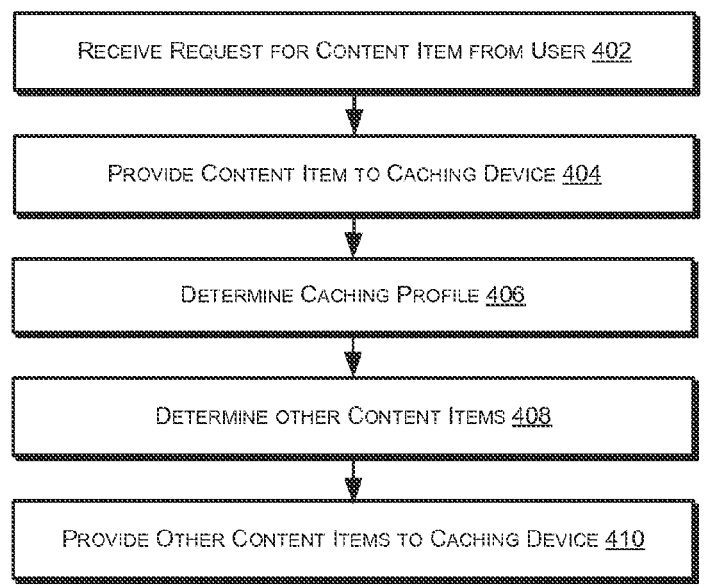
FIG. 4 illustrates a flow diagram of one example method that may be performed by a caching device or a content provider to determine a caching profile and provide content items for caching.

FIG. 4 illustrates a flow diagram of an example method 400 that may be performed by a caching device or a content provider computer to intelligently cache content items, such as the content head-end device 110 of FIGS. 1 and 2. However, the method 400 may be performed by any number of suitable devices, such as a set-top box, a smart TV, a DVR, a PC, a laptop, a tablet computer, a PDA, any combination of the foregoing, or the like. In certain embodiments, the method 400 may be performed by a suitable caching module or profile module associated with a content provider computer, such as the profile module 142 of the content head-end device 110 illustrated in FIG. 1.

The method 400 may begin at block 402, where the method 400 may receive a request for a content item from a user, such as one of the users 102a-n. As noted with reference to method 300 of FIG. 3, in some aspects, the request may be received via the one or more network interfaces 118 and/or I/O devices 120 of FIG. 1. Similarly, the request may be received from a set-top box, a DVR, a smart TV, or other device directly or indirectly coupled to a viewing device, such as one of the viewing devices 104a-n of FIG. 1.

At block 404, the method 400 provides a content item to a caching device, such as the home caching device 108, the group caching device 202, and/or the cache control device 212 of FIGS. 1 and 2. At block 406, the method 400 may determine a caching profile much like the method 300. As such, the caching profile may be determined based at least in part on user viewing history or preferences, home viewing history or preferences, group of homes viewing history or preferences, and/or other heuristic information associated with a user, a group of users, a home, a group of homes, a demographic group, a geographic group, or the like.

The method 400 may then, at block 408, determine other content items. The determination at block 408 may be based at least in part on the caching profile determined at block 406. For example, if the caching profile indicates that a first user generally watches college football on Saturday afternoons, the other content items may be other college football games available for download or viewing on Saturdays. Additionally, based on such a caching profile, the method 400 may determine, at block 408, that other appropriate content may also include professional football games on Sunday as well. At block 410, the method 400 may end by providing the other content items to a caching device, via the one or more I/O devices 120 and/or network interfaces 118.

The operations described and shown in the methods 300 and 400 of FIGS. 3 and 4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3 and 4 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A method for caching content, the method comprising:
receiving, by at least one communication interface of a local caching device from a content provider remote from the local caching device, a content item based at least in part on a first request received from a user of the local caching device, wherein the local caching device comprises a set-top box;
determining, by at least one processor in the local caching device, a first home content viewing profile associated with one or more first users associated with a first home;
determining, by the at least one processor, a second home content viewing profile associated with one or more second users associated with a second home;
determining, by the at least one processor, a group content viewing profile based on the first home content viewing profile and the second home content viewing profile;
directing local storage of, in at least one memory coupled to the at least one processor and based at least in part on the group content viewing profile, the received content item for a later retrieval, the at least one memory comprising at least one cache within the local caching device;
directing local storage of, in the at least one memory coupled to the at least one processor and based at least in part on the first home content viewing profile and the second home content viewing profile, the received content item for a later retrieval;
determining the content item is not requested for download within a time threshold; and
deleting the stored content item from the at least one memory;
wherein determining the group content viewing profile comprises determining the first home content viewing profile, and the second home content viewing profile based at least in part on heuristic information associated with the one or more first users associated with the first home and the one or more second users associated with the second home.

2. The method of claim 1, wherein determining the content viewing profile comprises determining a content viewing profile of the user based at least in part on one or more of the request from the user, the received content item, or other content items requested by the user.

3. The method of claim 1, wherein determining the content viewing profile comprises determining a content viewing profile of a second user associated with the user based at least in part on one or more of a second request or a second received content item different from the received content item, wherein the second request is from the second user or the second received content item is received in response to a request from the second user.

4. The method of claim 1, wherein determining the content viewing profile comprises determining a content viewing profile of a location associated with the user based at least in part on heuristic information associated with the location.

5. The method of claim 4, wherein the heuristic information comprises one or more of a requested content item, a time period during which content items are requested, a frequency of requested content items, or heuristic information associated with another location within a predefined group of locations.

6. The method of claim 1, wherein the content viewing profile comprises user preferences received from the user or user preferences formulated based at least in part on a content viewing history of the user.

7. The method of claim 1, wherein directing local storage of the received content item for later retrieval comprises storing the received content for a predetermined time period.

8. The method of claim 7, further comprising determining the predetermined time period based at least in part on one or more of the content viewing profile or an availability of remaining storage space of the at least one memory.

9. The method of claim 1, wherein the second request for the content item comprises a second request made by the user to the content provider.

10. The method of claim 1, wherein providing the stored content item to the user in response to a second request for the content item comprises providing the stored content item without receiving the content item a second time.

11. The method of claim 1, further comprising:
requesting a second content item based at least in part on the determined content viewing profile;
storing the second content item for a later retrieval; and
providing the stored second item to the user based at least in part on a first request for the second item by the user without receiving the second content item a second time.

12. The method of claim 1, wherein directing local storage of the received content item for a later retrieval further comprises identifying a storage location based upon a first location and a second location.

13. A system for caching content, comprising:
at least one communication interface of a local caching device configured to (i) receive, from a user of the local caching device, a request for a content item from a content provider, wherein the local caching device comprises a set-top box, (ii) transmit the request to the content provider, (iii) receive, from the content provider, the content item, and (iv) provide the content item to the user, wherein the content provider is remote from the local caching device;
at least one processor of the local caching device configured to (i) determine a first home content viewing profile associated with one or more first users associated with a first home based at least in part on a viewing history of the one or more first users, (ii) determine a second home content viewing profile associated with one or more second users associated with a second home, (iii) determine a group content viewing profile based on the first home content viewing profile and the second home content viewing profile, (iv) direct local storage of the requested content item based on the group content viewing profile, and (v) direct local storage of the requested content item based at least in part on the first home viewing profile and the second home content viewing profile or a caching instruction associated with the content item, (vi) determine the content item is not requested for download within a time threshold; and (vii) delete the stored content item; and
at least one memory of the local caching device configured to store the content viewing profile and the requested content item, wherein the at least one memory comprises at least one cache;
wherein the at least one communication interface is further configured to provide the content item to the user, based at on one or more of the first home content viewing profile, the second home content viewing profile, or the group home content viewing profile; and
wherein determining the group content viewing profile comprises determining the first home content viewing profile and the second home content viewing profile based at least in part on heuristic information associated with the one or more first users associated with the first home and the one or more second users associated with the second home.

14. The system of claim 13, wherein the at least one processor is further configured to:
determine other content items to request from the content provider based at least in part on the content viewing profile; and
direct local storage of the other content items for later playback.

15. The system of claim 13, wherein the at least one communication interface is further configured to:
request other content items from the content provider based at least in part on the content viewing profile; and
receive the other content items from the content provider.

16. The system of claim 13, wherein the at least one processor is further configured to (i) adjust a content viewing profile of the user based at least in part on a content viewing profile of another user, and (ii) determine a second content item to request from the content provider on behalf of the user based at least in part on the adjusted content viewing profile; and
wherein the at least one communication interface is further configured to (i) request the second content item based at least in part on the adjusted content viewing profile, (ii) receive the second content item in response to the request, and (iii) provide the second content item to the user.

17. One or more non-transitory computer-readable media storing computer-executable instructions that, when executed by at least one processor, configure the at least one processor to perform operations comprising:
receiving a first request for a content item from a user of a local caching device;
providing the content item to the local caching device, wherein the local caching device comprises a set-top box;
determining a first home caching profile associated with one or more first users associated with a first home based at least in part on the first request;
determining a second home caching profile associated with one or more second users associated with a second home;

determining a group caching profile based on the first home caching profile and the second home caching profile;

determining other content items to be stored by the local caching device based at least in part on the group caching profile;

determining other content items to be stored by the local caching device based at least in part on the first home caching profile and the second home caching profile; and deleting the stored content item from at least one memory if the content item is not requested for download within a time threshold;

wherein determining the group caching profile comprises determining the first home caching profile and the second home caching profile based at least in part on heuristic information associated with the one or more first users associated with the first home and the one or more second users associated the second home.

* * * * *